United States Patent
Klein

(10) Patent No.: US 8,341,054 B2
(45) Date of Patent: Dec. 25, 2012

(54) SYSTEM AND METHOD FOR BANK ACCOUNT MANAGEMENT AND CURRENCY INVESTMENT

(75) Inventor: David Klein, Dana Point, CA (US)

(73) Assignee: CDT Global Soft, Inc., Dana Point, CA (US)

( * ) Notice: Subject to any disclaimer, the term of this patent is extended or adjusted under 35 U.S.C. 154(b) by 184 days.

(21) Appl. No.: 12/830,165

(22) Filed: Jul. 2, 2010

(65) Prior Publication Data
US 2012/0005117 A1    Jan. 5, 2012

(51) Int. Cl.
*G06F 35/00*    (2006.01)
(52) U.S. Cl. .............................. 705/35; 705/36
(58) Field of Classification Search ............... 705/35–45
See application file for complete search history.

(56) References Cited

U.S. PATENT DOCUMENTS

| | | | |
|---|---|---|---|
| 5,825,003 A | 10/1998 | Jennings et al. | |
| 6,285,999 B1 | 9/2001 | Page | |
| 6,876,982 B1 | 4/2005 | Lancaster | |
| 7,047,218 B1 | 5/2006 | Wallman | |
| 7,165,044 B1 | 1/2007 | Chaffee | |
| 2003/0178281 A1* | 9/2003 | Goto et al. | 194/206 |
| 2004/0002910 A1 | 1/2004 | Mizukami | |
| 2004/0143536 A1 | 7/2004 | Haberle | |
| 2005/0044022 A1 | 2/2005 | Spirgel et al. | |
| 2005/0171894 A1 | 8/2005 | Traynor | |
| 2005/0216407 A1 | 9/2005 | Feldman et al. | |
| 2005/0283422 A1 | 12/2005 | Myr | |
| 2007/0136180 A1 | 6/2007 | Salomon | |
| 2007/0219894 A1* | 9/2007 | Guichard | 705/36 R |
| 2007/0271200 A1 | 11/2007 | Buchanan | |
| 2007/0282726 A1 | 12/2007 | Koester et al. | |
| 2008/0005013 A1 | 1/2008 | Wallman | |
| 2008/0016008 A1 | 1/2008 | Siegel et al. | |
| 2008/0027850 A1 | 1/2008 | Brittan et al. | |
| 2008/0162377 A1 | 7/2008 | Pinkas | |
| 2008/0288416 A1 | 11/2008 | Arnott et al. | |
| 2009/0037324 A1 | 2/2009 | McLaughlin et al. | |
| 2009/0132402 A1 | 5/2009 | Youngren et al. | |
| 2009/0132420 A1 | 5/2009 | Silverbrook et al. | |

FOREIGN PATENT DOCUMENTS

| | | |
|---|---|---|
| WO | WO 00/26745 | 5/2000 |
| WO | WO 00/55788 | 9/2000 |
| WO | WO 2005/055004 | 6/2005 |
| WO | WO 2008/009037 | 1/2008 |
| WO | WO 2008/051878 | 5/2008 |
| WO | WO 2009/016351 | 2/2009 |

OTHER PUBLICATIONS

Peter Macfariane "How a Multi-Currency Bank Account Can Help You Diversify Out of the Dollar", The Q Wealther Report, Jul. 13, 2009, pp. 1-4.*

* cited by examiner

*Primary Examiner* — Charles Kyle
*Assistant Examiner* — Jennifer Liu
(74) *Attorney, Agent, or Firm* — Jafari Law Group, Inc.; David V. Jafari

(57) ABSTRACT

The invention is a device for bank account management, comprising an input device adapted to receive information related to a diversification of an initial fund of a user, and a processor adapted to calculate a distribution of the initial fund comprising one or more selected currencies based upon the diversification information, convert the initial fund from an initial currency into a converted fund comprising one or more selected currencies based upon the calculated distribution, and record the information about the converted fund in a data file for the bank account.

31 Claims, 10 Drawing Sheets

SYSTEM AND METHOD FOR BANK ACCOUNT MANAGEMENT AND CURRENCY INVESTMENT

TECHNICAL FIELD OF THE INVENTION

The present invention relates in general to a system and method for bank account management and currency investment, and more specifically, to a system and method to increase purchasing power through long-term investment of a currency into one or more additional currencies.

COPYRIGHT & TRADEMARK NOTICE

A portion of the disclosure of this patent application may contain material that is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

BACKGROUND OF THE INVENTION

The value of a currency fluctuates in relation to other currencies as a function of economic reports, world events, and other significant factors. As such, the value of the U.S. dollar in relation to other worldwide currencies may fluctuate due to a number of factors. Currently, billions of dollars are traded in between currencies every day as a tool for wealth investment. As a result, diversification of wealth into a plurality of currencies may lead to increased long-term maintenance or increase in wealth compared to storing wealth within a single currency.

Access to currency investment as a tool for the average consumer, however is somewhat limited. Due to high commission fees on both ends of a currency transaction, the average consumer is frequently left in a position wherein currency trading is impractical. Additionally, due to the number of factors that can affect the currency values, investment in currency by the average consumer can pose high risk as it is speculative at best. As with other types of investments such as commodities or stocks, vast amounts of research is necessary in order to make a prudent investment within the currency market. Thus, there is a need in the art for a device that makes currency investment accessible to the average consumer.

Thus, current currency investment methods are impractical, inaccessible and pose a high risk to the average consumer. As such, there is a need in the art for a system and method for bank account management and currency investment. Specifically, there is a need for a system and method to maintain or increase wealth through long-term investment of a currency into one or more additional currencies. It is to these ends that the present invention has been developed.

SUMMARY OF THE INVENTION

To minimize the limitations in the prior art, and to minimize other limitations that will be apparent upon reading and understanding the present specification, the present invention describes a device for bank account management, comprising an input device adapted to receive information related to a diversification of an initial fund of a user, and a processor adapted to calculate a distribution of the initial fund comprising one or more selected currencies based upon the diversification information, convert the initial fund from an initial currency into a converted fund comprising one or more selected currencies based upon the calculated distribution, and record the information about the converted fund in a data file for the bank account.

The present invention also describes a method for managing a bank account, comprising receiving information related to a diversification of an initial fund of a user, calculating a distribution of the initial fund comprising one or more selected currencies based upon the diversification information, converting the initial fund from an initial currency into a converted fund comprising the selected currencies based upon the calculated distribution, and recording the information about the converted fund in a data file for the bank account.

The present invention further describes a computer-readable medium including codes extractable by a computer, adapted to receive information related to a diversification of an initial fund of a user, calculate a distribution of the initial fund comprising one or more selected currencies based upon the diversification information, convert the initial fund from an initial currency into a converted fund comprising the selected currencies based upon the calculated distribution, and record the information about the converted fund in a data file for the bank account.

It is an objective of the present invention to provide consumers with an opportunity to invest in multiple currencies.

It is another objective of the present invention to maintain wealth through investment in a plurality of monetary currencies.

It is yet another objective of the present invention to provide a method for long-term investment of money into multiple currencies.

Finally, it is objective of the present invention to provide an automated system and method for the maintenance of wealth through the investment of money into multiple currencies.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE DRAWINGS

In the following discussion that addresses a number of embodiments and applications of the present invention, reference is made to the accompanying drawings that form a part hereof, where depictions are made, by way of illustration, of specific embodiments in which the invention may be practiced. It is to be understood that other embodiments may be utilized and changes may be made without departing from the scope of the present invention.

Figure 1A:
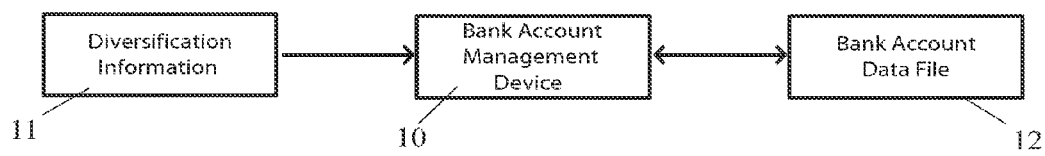
FIG. 1(a) illustrates a box diagram of an exemplary embodiment of a bank account management device applying modifications to a bank account data file.

FIG. 1(a) illustrates a box diagram of an exemplary embodiment of bank account management device 10 applying modifications to bank account data file 12. FIG. 1(a) shows bank account management device 10, receiving diversification information 11 from an external source and modifying bank account data file 12. Bank account management device 10 is designed to modify bank account data file 12 according to an optimization algorithm processed by bank account management device 10 utilizing diversification information 11. In alternative embodiments, bank account management device 10 may also utilize fund information from bank account data file 12 for the calculation of an optimized fund distribution within bank account data file 12.

In an exemplary embodiment of the present invention, bank account management device 10 may utilize diversification information 11 to calculate the best optimization scheme for the increase or maintenance of wealth for an initial fund of a user. In such an embodiment, an initial fund may comprise a fund deposit or funds contained in bank account data file 12. Alternatively, should diversification information 11 include a fund withdrawal request from bank account data file 12, bank account management device 10 may modify bank account data file 12 to comply with the withdrawal request, and then bank account management device 10 may modify bank account data file 12 to optimize the remaining funds stored in bank account data file 12 based upon diversification information 11.

Diversification information 11 is an information input utilized by bank account management device 10 to modify bank account data file 12 such that the wealth of a user may be, in an ideal scenario, most increased or maintained. In an exemplary embodiment of the present invention, diversification information 11 may comprise an initial fund input, such as a request to open a bank account data file, a fund deposit, fund transfer, a request to redistribute funds, or a request to withdraw money from the bank account data file. In other exemplary embodiments of the present invention, diversification information 11 may comprise a user risk factor, which may be defined as instructions for diversification or investment of the initial fund. In further exemplary embodiments, diversification information 11 may comprise guideline factors or variables that may be utilized by bank account management device 10 for the calculation of a distribution of the initial fund.

Bank account data file 12 may comprise an electronic data representation of a bank account fund, or other data file, wherein funds may be accessed, stored, transferred, deposited and withdrawn. Bank account data file 12 may be created, modified, or closed by bank account management device 10, according to diversification information 11. Further, bank account data file 12 may be read or accessed by bank account management device 10 in order to comply with instructions within diversification information 12. In an exemplary embodiment, bank account data file 12 may comprise a data module of a user's real and actual bank account, stored in a non-volatile data storage medium such as a hard drive or flash memory. In such embodiments, bank account management device 10 may modify bank account data file 12 according to diversification information 11.

To best optimize bank account data file 12 for wealth increase or maintenance based on the investment of an initial fund into a selected currency, bank account management device 10 must read bank account data file 12 to record the initial fund state and have a starting point for the optimization process. For example, should diversification information 11 include a currency exchange transaction request, bank account management device 10 may read bank account data file 12 to check for availability of specified funds in order to comply with diversification information 11.

Figure 1B:
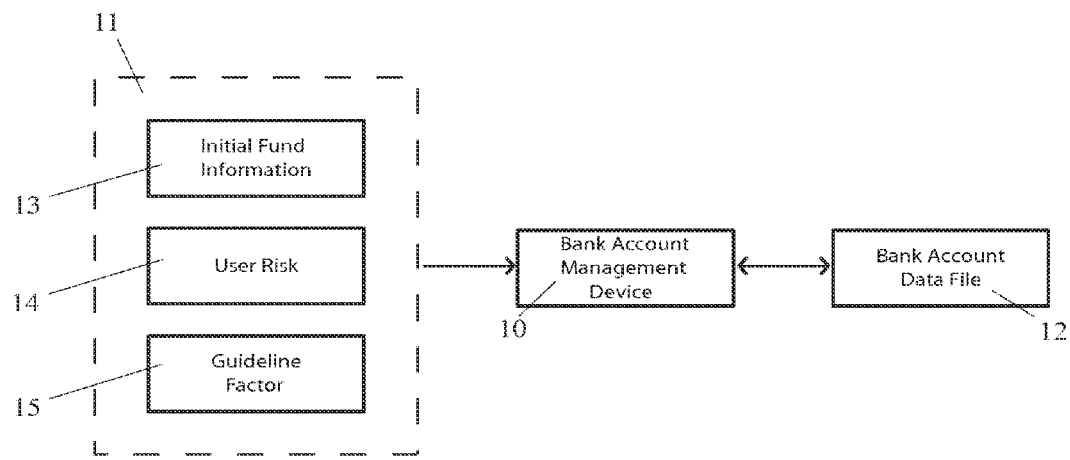
FIG. 1(b) illustrates a box diagram of a bank account management device receiving an input of exemplary diversification information.

FIG. 1(b) illustrates a box diagram of bank account management device 10 receiving an input of diversification information 11. FIG. 1(b) shows bank account management device 10, receiving diversification information 11 and modifying bank account data file 12, wherein diversification information 11 comprises initial fund information 13, user risk 14, and guideline factor 15. Bank account management device 10 is designed to modify bank account data file 12 according to an optimization algorithm processed by bank account management device 10 utilizing diversification information 11.

Diversification information 11 may comprise initial fund information 13, which in an exemplary embodiment, is as user input describing a requested fund transaction. For example, initial fund information 13 may comprise a user input including a fund deposit, fund transfer, fund reallocation, or fund withdrawal. In such embodiments, bank account data file 12 is modified by bank account management device 10 to comply with initial fund information 13. Should initial fund information 13 comprise a fund deposit, then bank account management device 10 may deposit the initial fund into bank account data file 12 and then redistribute the funds in bank account data file 12 for optimization, utilizing diversification information 11. Alternatively, should initial fund information 13 comprise a request to withdraw funds, bank account management device 10 may withdraw the appropriate funds from bank account data file 12, if available, and then optimize the fund distribution in bank account data file 12 utilizing diversification information 11.

Diversification information 11 may also comprise user risk 14, which is a user input describing instructions for diversification or investment of a fund. In exemplary embodiments of the present invention, user risk 14 may comprise an instruction including requested currency investments. Such currency investment instructions may state a number of currencies to be utilized for fund diversification, or may specifically cite requested currencies for investment. For example, in exemplary embodiments, user risk 14 may comprise an instruction to invest in the "G8" currencies, the top ten Asian currencies, or some other specific set of currencies. Alternatively, user risk 14 may comprise an instruction to invest in a specific number of currencies, wherein bank account management device 10 may then best optimize a distribution for currency diversification.

In yet other embodiments of the present invention, diversification information 11 may comprise guideline factor 15. Guideline factor 15 is a set of user input information that may be utilized by bank account management device 10 for the calculation of a distribution for a fund in bank account data file 12. In an exemplary embodiment, guideline factor 15 may comprise currency exchange rate data between the initial currency and selected currencies. In other embodiments, guideline factor 15 may comprise gross domestic product of nations in which their respective currency is utilized, historical economic information, government loan rates, currency exchange fees, currency transaction costs, quarterly financial reports, financial news or current events, or other relevant news or financial data information. In each of these embodiments, bank account management device 10 may utilize guideline factor 15 information to calculate a distribution to determine how much of a fund is to be invested into a selected currency for bank account data file 12.

In further embodiments of the present invention, guideline factor 15 may comprise a rate of yield factor or a currency efficiency rate factor. Rate of yield and currency efficiency rate will be discussed in detail below.

Figure 2A:
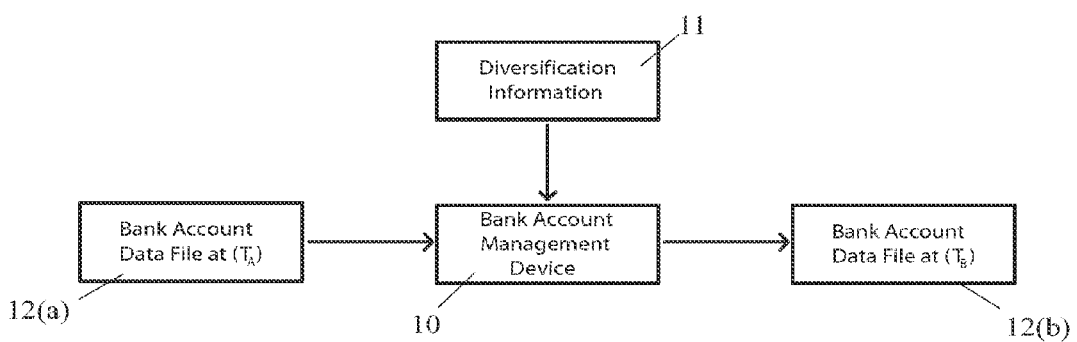
FIG. 2(a) illustrates a box diagram of an exemplary embodiment of a bank account management device and a bank account data file at times $T_A$ and $T_B$.
Figure 2B:
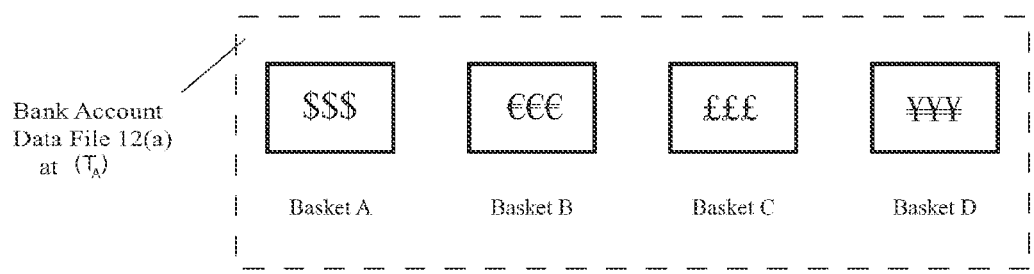
FIG. 2(b) illustrates a box diagram of an exemplary embodiment of a bank account data file at times $T_A$ and $T_B$.
Figure 2B:
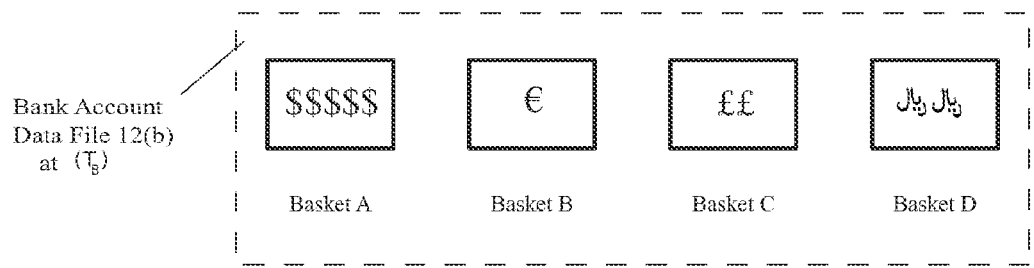

FIG. 2(*a*) illustrates a box diagram of an exemplary embodiment of bank account management device 10 and bank account data file 12 at times $T_A$ and $T_B$. FIG. 2(*a*) shows bank account management device 10 receiving diversification information 11 and bank account information from bank account data file 12 at a first time $T_A$, labeled as 12(*a*). FIG. 2(*a*) further shows bank account management device 10 modifying bank account data file 12 at a second time $T_B$, labeled as 12(*b*).

FIG. 2(*b*) illustrates a box diagram of exemplary embodiments of a bank account data files 12(*a*) and 12(*b*) at times $T_A$ and $T_B$, respectively. FIG. 2(*b*) shows bank account data file 12(*a*), comprising a first set of currencies at time $T_A$, and bank account data file 12(*b*), comprising a second set of currencies at time $T_B$. Bank account management device 10 reads bank account data file 12(*a*) at a first time $T_A$ and redistributes the funds, modifying bank account data file 12(*b*) at $T_B$.

Bank account data file 12(*a*) is bank account data file 12 at a first time $T_A$. In an exemplary embodiment of the present invention, bank account data file 12(*a*) may comprise an initial fund including a first set of currencies, as shown in baskets A-D. Bank account data file 12(*b*) is bank account data file 12 at a second time $T_B$, which may comprise a converted fund including a second set of currencies.

In the present example illustrated in FIG. 2(*b*), bank account data file 12(*a*) includes an initial distribution comprising U.S. dollars, euros, British pounds, and Japanese yen. In alternative embodiments, bank account data file 12(*a*) may comprise a different set of currencies, including additional or fewer currencies, and different amounts of wealth stored in each currency. As illustrated in FIG. 2(*b*), bank account data file 12(*b*) at time $T_B$ includes a different amount of U.S. dollars within basket A than within bank account data file 12(*a*) at time $T_A$. Bank account data file 12(*b*) also includes fewer euros and British pounds, but comprises Iranian Rials and lacks Japanese Yen. In alternative embodiments, bank account data file 12(*b*) may comprise a different set of currencies, including additional or fewer currencies, and different amounts of each selected currency.

Bank account management device 10 modifies bank account data file 12(*a*) into bank account data file 12(*b*) according to an optimization algorithm utilizing diversification information 11. Additionally, bank account management device 10 may read bank account data file 12(*a*) and utilize diversification information 11 to calculate a distribution and modify bank account data file 12(*a*) into bank account data file 12(*b*). As such, bank account management device 10 modifies bank account data file 12(*a*), and its set of selected currencies, into bank account data file 12(*b*), and its set of converted currencies, according to an optimization algorithm based upon diversification information 11.

Figure 3:
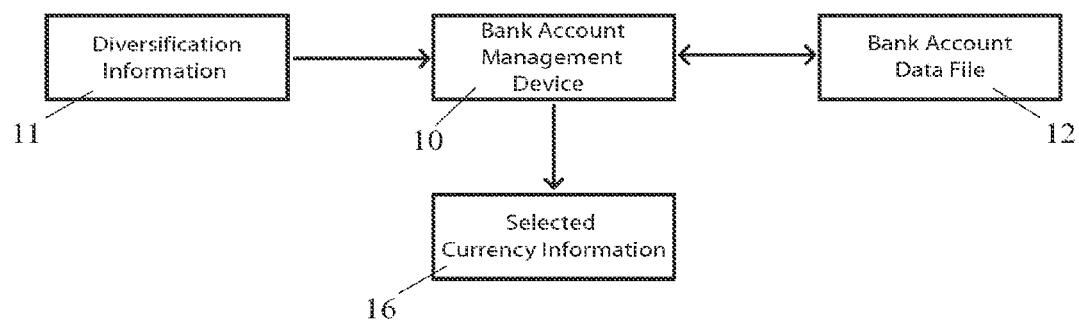
FIG. 3 illustrates a box diagram of an exemplary embodiment of a bank account management device and the output of selected currency information.

FIG. 3 illustrates a box diagram of an exemplary embodiment of bank account management device 10 and the output of selected currency information 16. FIG. 3 shows bank account management device 10 receiving diversification information 11, modifying bank account data file 12 and outputting selected currency information 16. Bank account management device 10 is designed to modify bank account data file 12 according to diversification information 11 and bank account information from bank account data file 12 and output selected currency information 16.

Selected currency information 16 is a fund information designed to reflect the status of funds within bank account data file 12 and to illustrate modifications made to bank account data file 12. Selected currency information 16 is fund information designed for output to a user in order to reflect currencies selected by bank account management device 10 and stored within bank account data file 12. In an exemplary embodiment of the present invention wherein initial fund information 13 comprises a fund withdrawal, selected currency information 16 may comprise fund data including a summary of funds withdrawn from bank account data file 12 and funds remaining within bank account data file 12 before and after fund optimization and redistribution by bank account management device 10.

In an alternative embodiment of the present invention, selected currency information 16 may be utilized by an external device to output fund information to a user of bank account management device 10. For example, should initial fund information 13 comprise a request for fund withdrawal, then selected currency information 16 may comprise an instruction or confirmation to an external device to output the requested funds to the user. As such, when initial fund information 13 comprise a request for fund withdrawal through an ATM, selected currency information 16 may comprise an instruction to the ATM to physically output the requested funds. Conversely, wherein initial fund information 13 comprises an electronic fund transfer to, for example, a third party bank account, selected currency information 16 may comprise an instruction to electronically transfer the requested funds to the third party bank account.

Figure 4:
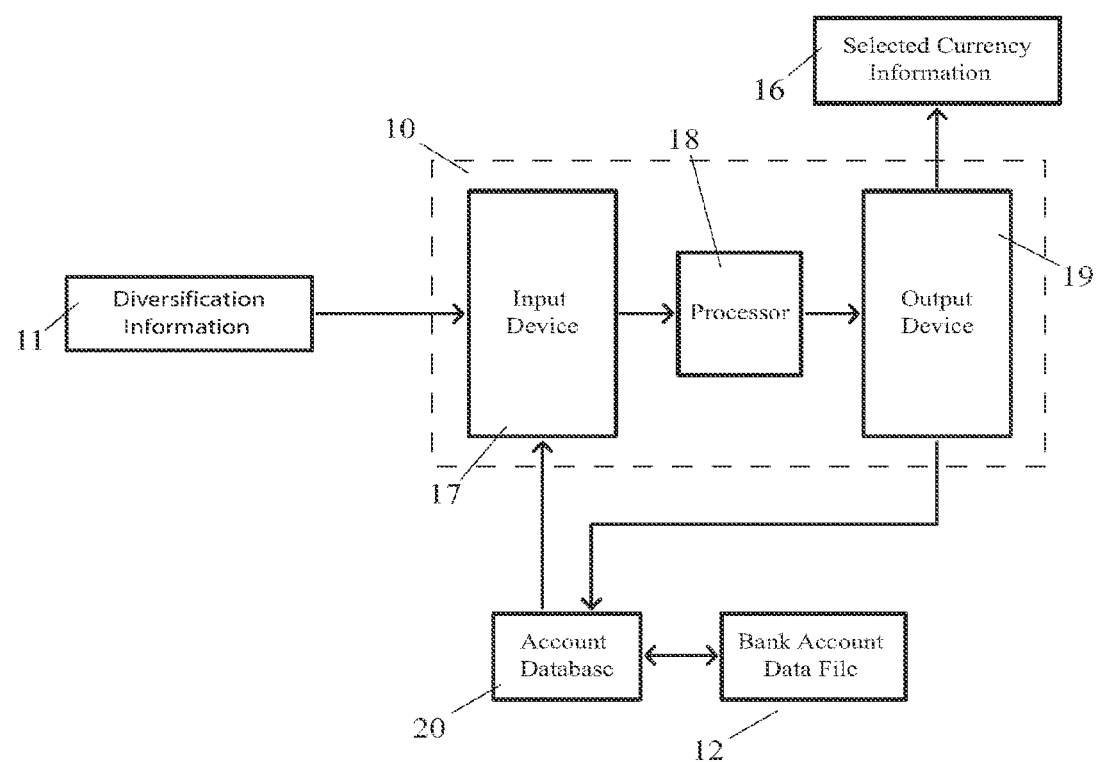
FIG. 4 illustrates a box diagram of an exemplary embodiment of internal components of a bank account management device and its output.

FIG. 4 illustrates a box diagram of an exemplary embodiment of the internal components of bank account management device 10. FIG. 4 shows bank account management device 10, comprising input device 17, processor 18 and output device 19. Input device 17 receives diversification information 11 and bank account information related to bank account data file 12, which may be located in account database 20. Processor 18 modifies bank account data file 12 through output device 19, which also outputs selected currency information 16.

Input device 17 is a component of bank account management device 10 designed to receive user input information for analysis and utilization by processor 18. In exemplary embodiments of the present invention, input device 17 may receive diversification information 11, including initial fund information 13, user risk 14, guideline factor 15, or some other information input relevant to the optimization of fund diversification in bank account data file 12. When input device 17 receives an information input for bank account management device 10, including diversification information 11 or bank account information related to bank account data file 12 from account database 20, input device 17 may relay the input to processor 18.

Processor 18 is a component of bank account management device 10 designed to analyze and utilize information received by bank account management device 10 through input device 17 for the diversification of funds in bank account data file 12. In an exemplary embodiment of the present invention, processor 18 utilizes diversification information 11 to create an optimal distribution of funds for wealth increase or maintenance in bank account data file 12. Once an optimized distribution of funds has been calculated, processor 18 may instruct output device 19 to apply necessary modifications to bank account data file 12.

Output device 19 is a component of bank account management device 10 designed to output instructions issued by processor 18 for the modification of bank account data file 12. In an exemplary embodiment of the present invention, output device 19 may access account database 20 and modify bank account data file 12 to correspond with the optimized fund distribution as calculated by processor 18. In exemplary embodiments, account database 20 may comprise of a plurality of bank account data files, each corresponding to a unique bank account. In an alternative embodiment, output device 19 may access bank account data file 12 directly to apply modifications to correspond with the optimized fund distribution as calculated by processor 18.

In alternative embodiments of the present invention, processor 18 may also instruct output device 19 to output selected currency information 16. In such embodiments, output device 19 may output selected currency information 16, which may reflect modifications applied to bank account data file 12, the current fund distribution contained in bank account data file 12, or other information related to bank account data file 12.

Figure 5A:
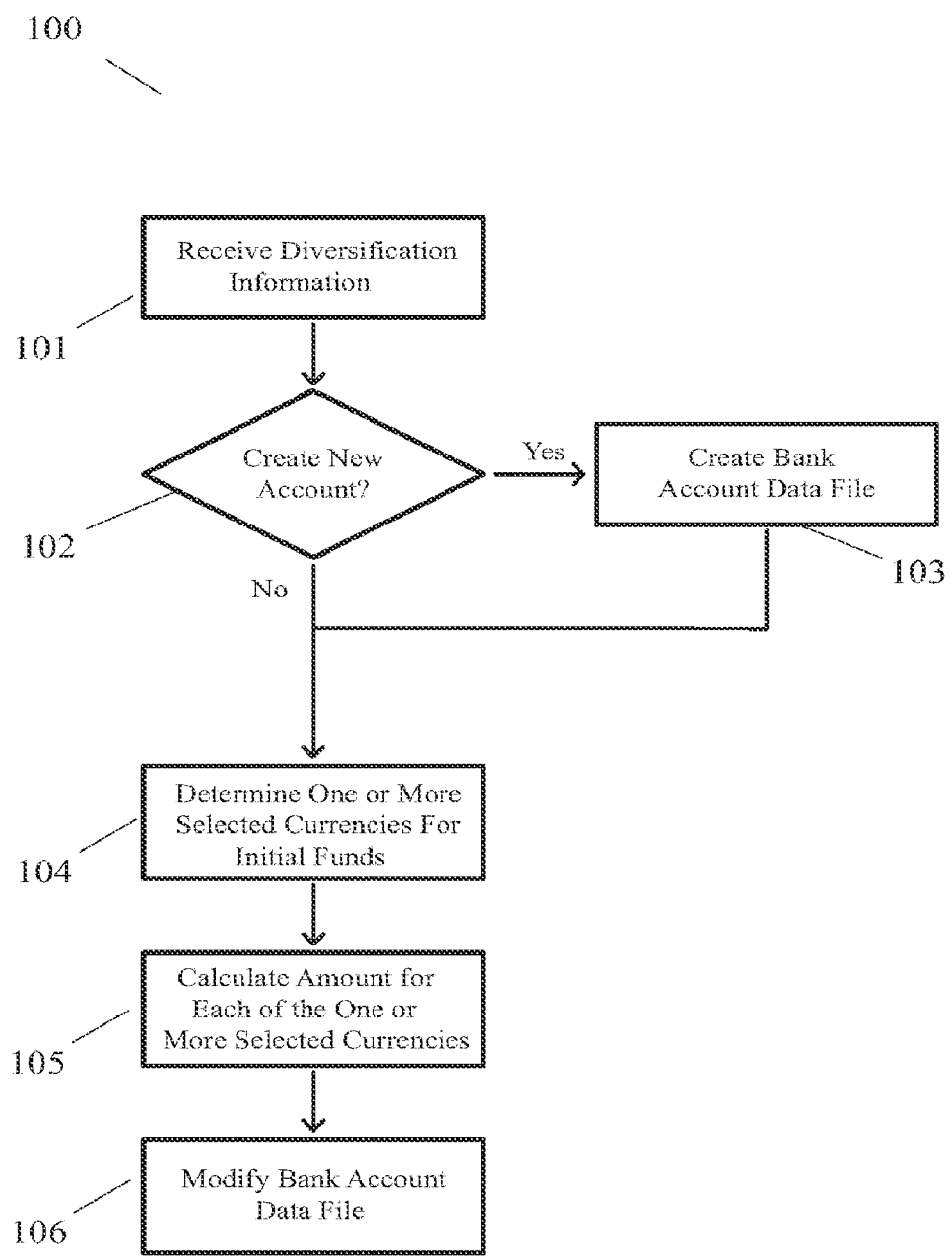
FIG. 5(a) illustrates a flow chart of a method utilized by a bank account management device for the creation or modification of a bank account data file.
Figure 5B:
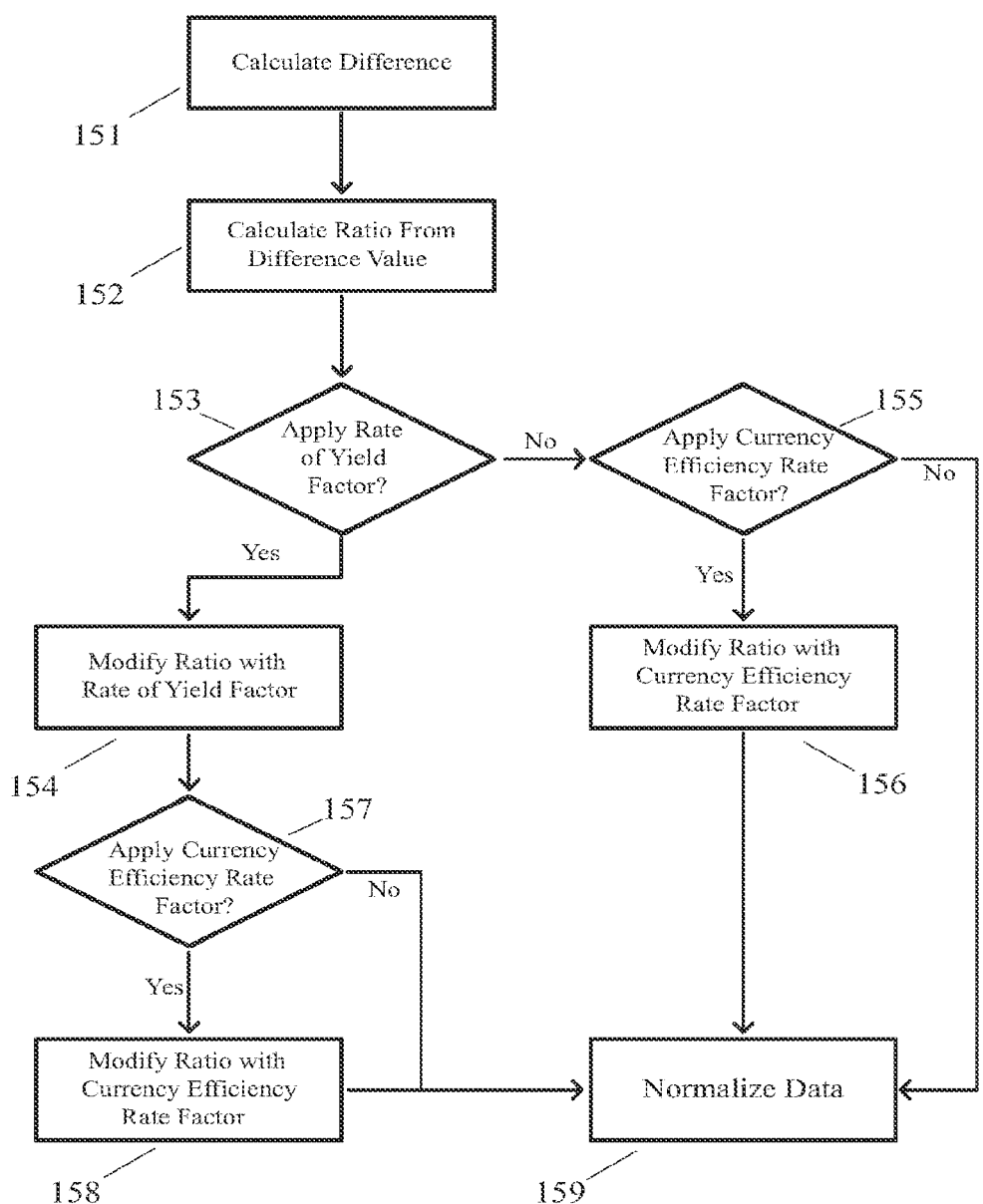
FIG. 5(b) illustrates a flow chart of a method utilized by a bank account management device for the calculation of a distribution of an initial fund.

FIG. 5(*a*) illustrates a flow chart of method 100 utilized by bank account management device 10 for the creation or modification of bank account data file 12. Method 100 is explained in the order shown below; however, the following steps may be taken in any other conceivable sequence without deviating from the scope of the present invention.

In step 101, bank account management device 10 receives diversification information 11 via input device 17. Input device 17 may relay diversification information 11 to processor 18 for analysis and usage in the optimization of bank account data file 12. In an exemplary embodiment wherein diversification information 11 comprises initial fund information 13, processor 18 analyzes initial fund information 13 and bank account data file 12, should it already exist, to determine what action is requested by a user and whether the action is possible.

In step 102, processor 18 determines whether a new bank account data file 12 is to be created. In an exemplary embodiment wherein diversification information 11 comprises initial fund information 13, which further comprises an instruction to open a new bank account data file 12 and a fund deposit, then bank account management device 10 proceeds to step 103. If, however, processor 18 determines, based upon diversification information 11, that a new bank account data file 12 is not to be created, then bank account management device 10 proceeds step 104. In step 103, if bank account data file 12 does not exist, processor 18 instructs output device 19 to create bank account data file 12 in database 20 and then proceed to step 104.

In step 104, bank account management device 10 determines one or more selected currencies for the optimization of initial funds stored in bank account data file 12. Processor 18 may utilize diversification information 11 and bank account information related to bank account data file 12 prior to optimization for its calculation of an optimized distribution of funds. In an exemplary embodiment of the present invention wherein diversification information 11 comprises user risk 14, processor 18 may utilize user risk 14 as previously described to determine select currencies for the conversion of the initial fund. Alternatively, guideline factor 15 may be utilized for the determination of one or more selected currencies. Once processor 18 determines the selected currencies in which funds will be invested, bank account management device 10 proceeds to step 105.

In step 105, bank account management device 10 calculates the amount of wealth to be invested into each currency selected previously in step 104. Processor 18 may utilize diversification information 11 and bank account information related to bank account data file 12 prior to optimization for its calculation of an optimized distribution of funds. The calculation performed by processor 18 will be described in further detail for FIG. 5(*b*). In alternative embodiments of the present invention, steps 104 and 105 may be performed concurrently. Once the amount to be invested in each selected currency has been determined, bank account management device 10 proceeds to step 106.

Finally, in step 106, bank account management device 10 modifies bank account data file 12 according to the optimized distribution determined in steps 104 and 105. In an exemplary embodiment of the present invention, output device 19 may modify bank account data file 12 according to instructions relayed by processor 18. In other embodiments of the present invention, in step 106, bank account management device 10 may also output selected currency information 16. In such embodiments, output device 19 may output selected currency information 16 based upon the optimized fund distribution determined in steps 104 and 105, modifications made to bank account data file 12, and compliance with diversification information 11.

FIG. 5(*b*) illustrates a flow chart of step 105 from method 100 utilized by bank account management device 10 for the calculation of a distribution of an initial fund to be stored in bank account data file 12 utilizing currency exchange rate information. Step 105 is accomplished through the performance of steps 151-159 as explained in the order shown below; however, the following steps may be taken in any other conceivable sequence without deviating from the scope of the present invention.

To calculate a distribution of an initial fund into a set of selected currencies as previously defined as step 105 in method 100, bank account management device 10 begins with step 151. In the embodiment of step 105 illustrated in FIG. 5(*b*) and herein described, bank account management device 10 utilizes diversification information 11 comprising guideline factor 15, which comprises currency exchange rate data. However, in other embodiments of the present invention, bank account management device 10 may utilize other types of diversification information 11, such as gross domestic product of nations in which their respective currency is considered, historical economic information, quarterly financial reports, financial news or current events, or other relevant news or financial data information.

In step 151, bank account management device 10 utilizes guideline factor 15 to calculate a percentage difference between the exchange rate between the initial fund currency and a selected currency over the period between time $T_1$ and time $T_2$. For example, suppose the exchange rate between the initial currency of U.S. dollars and a selected currency comprising British pounds is \$2.00/£1.00 at time $T_1$, and the exchange rose to \$2.05/£1.00 at time $T_2$. Thus, the difference would comprise a \$0.05/£1.00 gain, or a percentage difference of 0.025 (2.5%). As such, this percentage difference is calculated for the difference between the exchange rate for each of the selected currencies and the initial currency. Once the percentage difference is calculated for the exchange rate between the initial currency and each of the selected currencies as defined in diversification information 11, bank account management device 10 proceeds to step 152.

In step 152, bank account management device 10 identifies the selected currency which experienced the highest percentage difference in the exchange rate with the initial currency between times $T_1$ and $T_2$. For example, in an exemplary embodiment wherein the initial currency is U.S. dollars and the selected currencies are British Pounds, European Union Euros, and Japanese Yen, suppose the percentage differences in the exchange rates between times $T_1$ and $T_2$ were 0.010, 0.026, and 0.014, respectively. As such, the highest percentage difference in the exchange rates was with the Euro, at 0.026.

Once the highest percentage difference between exchange rates at times $T_1$ and $T_2$ is discovered, then processor 18 calculates a ratio between the percentage difference for a selected currency and the percentage difference for the highest selected currency of the set of selected currencies. As such, in the previous example wherein the selected currencies are British Pounds, European Union Euros, and Japanese Yen, and the percentage differences in the exchange rates between times $T_1$ and $T_2$ were 0.010, 0.026, and 0.014, respectively, then the calculated ratios would be 0.385, 1.0, and 0.538, respectively, as each percentage difference is divided by the highest percentage difference. Once the ratio between the percentage difference and the highest percentage difference is calculated for the set of selected currencies, bank account management device 10 proceeds to step 153.

In step 153, after the ratio between the percentage difference and the highest percentage difference is calculated, processor 18 determines if a rate of yield factor is to be applied to the data prior to normalization. A rate of yield factor may be understood as a weighted value to be applied to the ratio data in order to weigh it towards an equal shared value. Processor 18 may determine if a rate of yield factor is to be applied based upon diversification information 11. In an exemplary embodiment of the present invention wherein a rate of yield factor is to be applied, bank account management device 10 may receive guideline factor 15 as a user input, comprising a rate of yield factor. Should processor 18 determine that a rate of yield factor is to be applied, then the ratio values may be modified in step 154. If, however, processor 18 determines that a rate of yield factor is not to be applied, then bank account management device 10 may proceed to step 155.

Should processor 18 determine that a rate of yield factor is to be applied to the ratio values calculated in step 152, then in step 154, processor 18 modifies the ratio values by applying the rate of yield factor. For example, without the application of a rate of yield factor, the ratio values previously discussed for the British Pound, European Union Euro, and Japanese Yen, were 0.385, 1.0, and 0.538, respectively. However, if a rate of yield factor of 1.0 is to be applied to the ratio values, then the modified ratio values for the British Pound, European Union Euro, and Japanese Yen, would be 1.385, 2.0, and 1.538, respectively, as a value of 1.0 is added to each ratio value. Once the ratio values have been modified, bank account management device 10 may proceed to step 157.

In step 155, processor 18 determines if bank account management device 10 is to apply a currency efficiency rate factor to the ratio values calculated in step 152. A currency efficiency rate factor may be understood as a ranked modifier that may be applied to the ratio data calculated in step 152 in order to amplify the fund distribution share of the higher performing selected currencies as opposed to the fund distribution share of the lower performing selected currencies. Processor 18 may determine if a currency efficiency rate factor is to be applied based upon diversification information 11. In an exemplary embodiment of the present invention wherein a currency efficiency rate factor is to be applied, bank account management device 10 may receive guideline factor 15 as a user input, comprising a currency efficiency rate factor. Should processor 18 determine that a currency efficiency rate factor is to be applied, then the ratio values may be modified in step 156. If, however, processor 18 determines that a currency efficiency rate factor is not to be applied, then bank account management device 10 may proceed to step 159.

Should processor 18 determine that a currency efficiency rate factor is to be applied to the ratio values calculated in step 152, then in step 156, processor 18 modifies the ratio values by applying the currency efficiency rate factor. For example, without the application of either a rate of yield factor or the currency efficiency rate factor, the ratio values previously discussed for the British Pound, European Union Euro, and Japanese Yen, were 0.385, 1.0, and 0.538, respectively. However, if a currency efficiency rate factor of 0.5 is to be applied to the ratio values, then the modified ratio values for the British Pound, European Union Euro, and Japanese Yen, would be 0.885, 2.5, and 1.538, respectively, as 0.5 is added to the British Pound ratio value, 1.0 is added to the Japanese Yen ratio value, and 1.5 is added to the European Union Euro ratio value. Once the ratio values have been modified, bank account management device 10 may proceed to step 159.

In alternative embodiments of the present invention, bank account management device 10 may perform step 157, wherein processor 18 determines if bank account management device 10 is to further apply a currency efficiency rate factor to the ratio values as previously modified in step 154. As discussed in step 155, processor 18 may determine if a currency efficiency rate factor is to be applied based upon diversification information 11.

Should processor 18 determine that a currency efficiency rate factor is to be further applied to the ratio values, then bank account management device 10 may proceed to step 158, wherein processor 18 modifies the ratio values by applying the currency efficiency rate factor. Once the ratio values have been modified, bank account management device 10 may proceed to step 159. If, however, processor 18 determines that a currency efficiency rate factor is not to be applied, then bank account management device 10 may proceed to step 159.

In step 159, the ratio values, whether or not they have been modified in steps 153-158, are normalized. Processor 18 may normalize the ratio values by dividing each ratio value by the sum of the total ratio value set. As in the previous example, if the ratio values for the British Pound, European Union Euro, and Japanese Yen, were 0.385, 1.0, and 0.538, respectively, then the sum of the ratio value set would be 1.923. As such, the normalized share for each selected currency would be the selected currency ratio value divided by the sum of the ratio value set, or, for the British Pound, European Union Euro, and Japanese Yen, 0.200, 0.520, and 0.280, respectively.

In the exemplary embodiment wherein a rate of yield factor was applied in step 154, processor 18 may normalize the modified ratio values. Wherein the modified ratio values for the British Pound, European Union Euro, and Japanese Yen, were 1.385, 2.0, and 1.538, respectively, the sum of the modified ratio values would be 4.923. As such, the normalized share for the British Pound, European Union Euro, and Japanese Yen would be 0.281, 0.406, and 0.312, respectively. In the exemplary embodiment wherein a currency efficiency rate factor was applied in step 158, and the modified ratio values for the British Pound, European Union Euro, and Japanese Yen, would be 0.885, 2.5, and 1.538, respectfully, the sum of the modified ratio values would be 4.923. As such, the normalized share for the British Pound, European Union Euro, and Japanese Yen would be 0.180, 0.508, and 0.312, respectfully.

Figure 6:
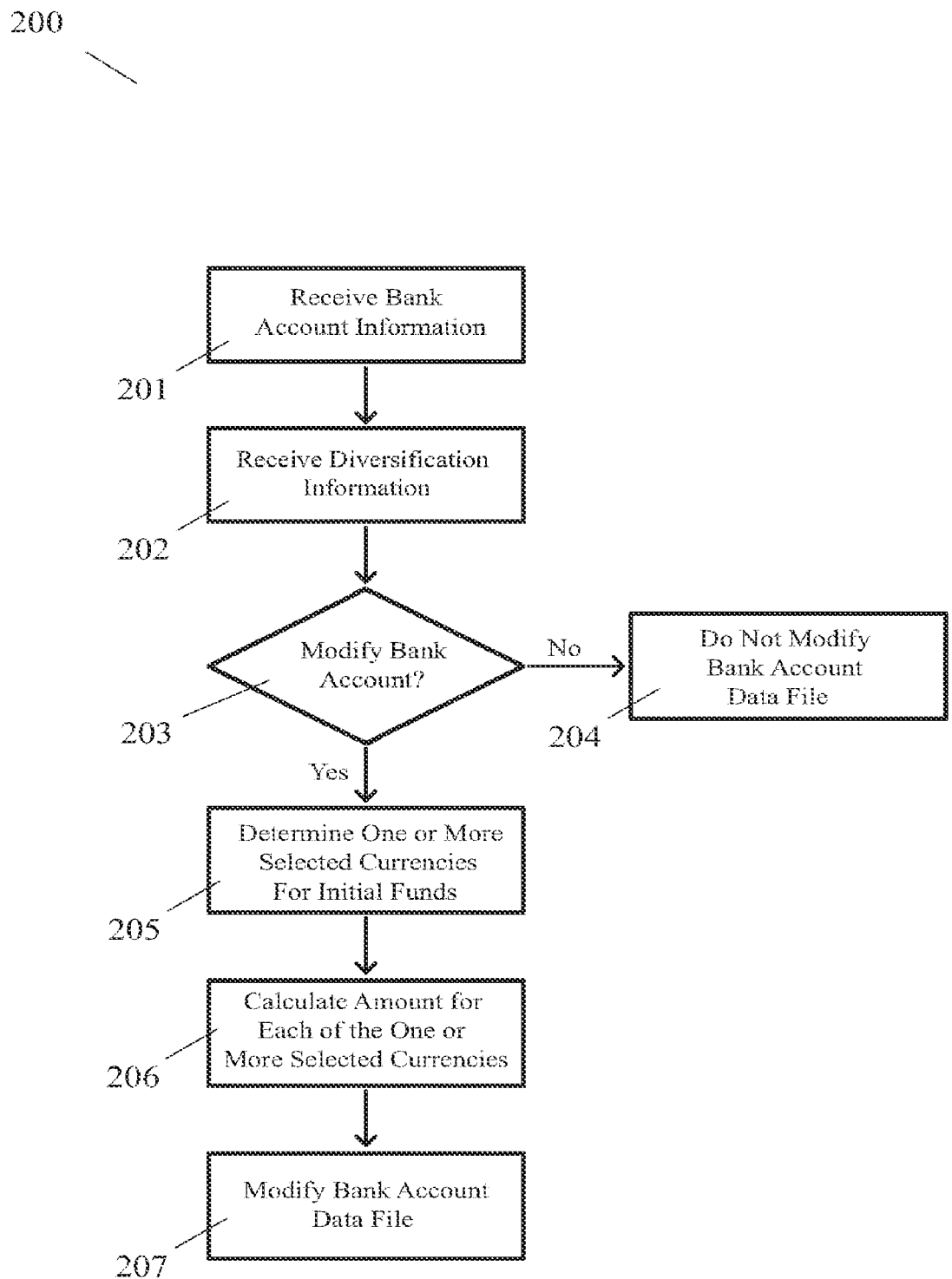
FIG. 6 illustrates another flow chart of a method utilized by a bank account management device for the modification of a bank account data file.

FIG. 6 illustrates a flow chart of method 200 utilized by bank account management device 10 for the modification of bank account data file 12. In the exemplary embodiment of the present invention illustrated in FIG. 6, bank account data file 12 may be understood as already including an initial fund. As such, method 200 may be utilized by bank account management device 10 for the modification of bank account data file 12 without the withdrawal, transfer, or deposit of funds to bank account data file 12. Furthermore, method 200 is explained in the order shown below; however, the following steps may be taken in any other conceivable sequence without deviating from the scope of the present invention.

In step 201, bank account management device 10 may receive bank account information from bank account data file 12 through input device 17. In step 202, bank account management device 10 may receive diversification information 11, such as user risk 14 or guideline factor 15.

In step 203, bank account management device 10 determines if modification of bank account data file 12 would enhance wealth increase or maintenance. In exemplary embodiments, bank account management device 10 may utilize diversification information 11 in an optimization algorithm to determine if changes to bank account data file 12 would increase wealth or better maintain wealth based upon diversification information 11. Should bank account management device 10 determine that no modification to bank account data file 12 is necessary, i.e. the fund distribution in bank account data file 12 best enhances or maintains wealth according to diversification information 11, or in other embodiments user risk 14, then in step 204 bank account management device 10 does not modify bank account data file 12. If, however, bank account management device 10 determines that modification to bank account data file 12 will enhance or maintain wealth better than the fund distribution stored in bank account data file 12, then bank account management device 10 may proceed to step 205.

In step 204, bank account management device 10 will not modify bank account data file 12. As a result, bank account management device 10 may discontinue analysis of bank account data file 12 until method 200, or some other method, is started again. In an alternative embodiment, output device 19 may output selected currency information 16 and a message communicating that fund redistribution will not occur.

In step 205, bank account management device 10 determines one or more selected currencies for the optimization of initial funds stored in bank account data file 12. Processor 18 may utilize diversification information 11 and fund information from bank account data file 12 prior to optimization for calculation of an optimized distribution of funds. Once processor 18 determines the selected currencies in which funds will be invested, bank account management device 10 proceeds to step 206.

In step 206, bank account management device 10 calculates the amount of wealth to be invested in each of the selected currencies determined in step 205. This calculation step may be similar or identical to step 105 in method 100, illustrated in FIG. 5(b) and previously described. Processor 18 may utilize diversification information 11 and fund information stored in bank account data file 12 prior to optimization for calculation of an optimized distribution of funds. In an alternative embodiment of the present invention, steps 205 and 206 may be performed concurrently. Once the new fund distribution has been determined, bank account management device 10 proceeds to step 207.

In step 207, bank account management device 10 modifies bank account data file 12 according to the optimized distribution determined in steps 205 and 206. In an exemplary embodiment of the present invention, output device 19 may modify bank account data file 12 according to instructions relayed by processor 18.

Figure 7:
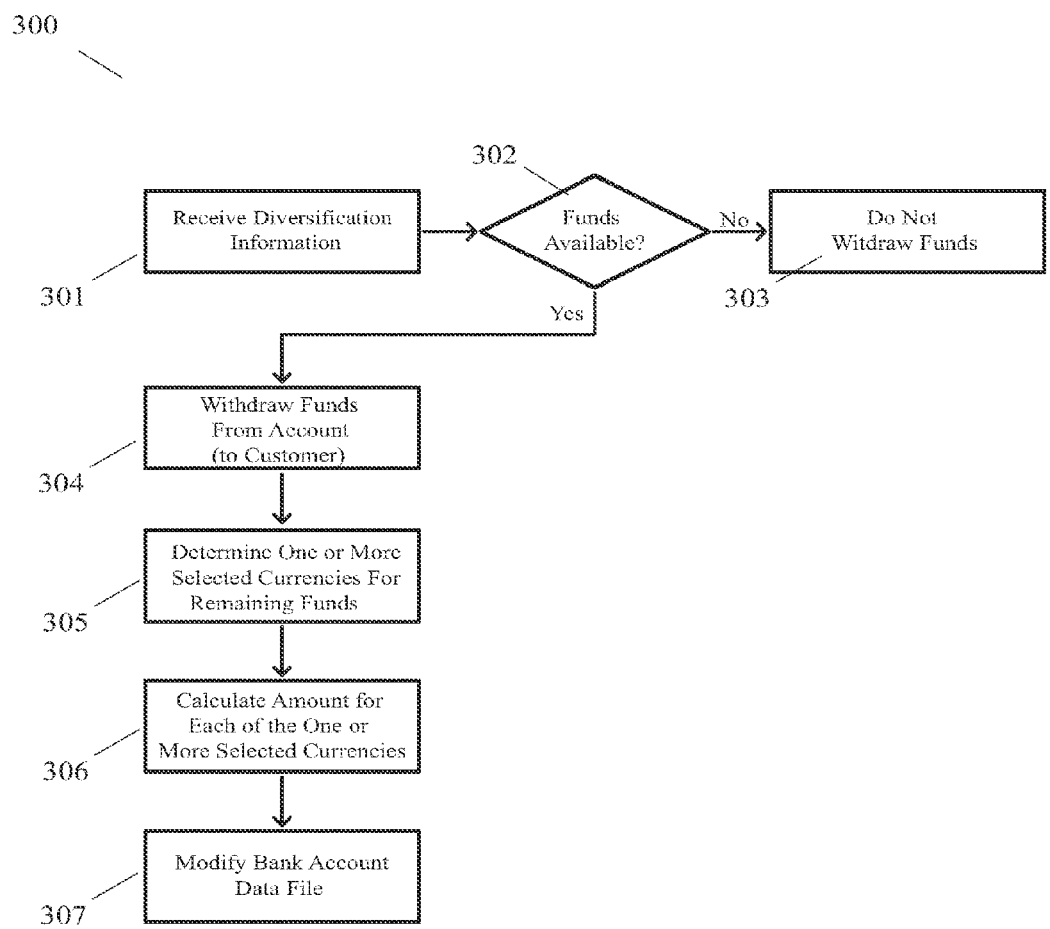
FIG. 7 illustrates a flow chart of a method utilized by a bank account management device for the modification of a bank account data file in response to a withdrawal of funds.

FIG. 7 illustrates a flow chart of method 300 utilized by bank account management device 10 for the modification of a bank account data file in response to a request to withdraw funds from bank account data file 12. Method 300 is explained in the order shown below; however, the following steps may be taken in any other conceivable sequence without deviating from the scope of the present invention.

In step 301, bank account management device 10 receives diversification information 11 via input device 17, which relays diversification information 11 to processor 18. In the present embodiment depicted in FIG. 7, diversification information 11 comprises initial fund information 13 which comprises a request to withdraw funds from bank account data file 12. In step 302, bank account management device 10 checks bank account data file 12 via input device 17 to see if the requested funds from diversification information 11 are available. Processor 18 compares the fund request of diversification information 11 with the fund information stored in bank account data file 12. In an exemplary embodiment, processor 18 may utilize currency exchange rates in order to properly calculate the total wealth available in bank account data file 12. If the requested funds are not available, bank account management device 10 proceeds to step 303. If the requested funds are available, bank account management device 10 proceeds to step 304.

In step 303, bank account management device 10 does not withdraw requested funds. As a result, bank account management device 10 does not modify bank account data file 12, and in some embodiments of the present invention, bank account management device 10 outputs selected currency information 16 via output device 19, comprising a message detailing inadequate funds for compliance with the withdrawal request.

In step 304, bank account management device 10 withdraws the funds requested in diversification information 11 from bank account data file 12. In exemplary embodiments, bank account management device 10 may output selected currency information 16 via output device 19. In such embodiments, selected currency information 16 may comprise information or fund data regarding the withdrawn funds such that an external device, such as an ATM, may output physical currency to the user. Alternatively, funds may be electronically transferred via output device 19 to an external device, such as another bank account. Bank account management device 10 may then proceed to step 305.

In step 305, bank account management device 10 determines one or more selected currencies for an optimized currency distribution for the remaining funds in bank account data file 12, according to diversification information 11 and bank account information from bank account data file 12. Because funds were withdrawn from bank account data file 12, processor 18 may utilize diversification information 11 to adjust bank account data file 12 prior to its determination of the optimal currencies for the increase or maintenance of wealth. Once currencies are selected, bank account management device 10 may proceed to step 306.

In step 306, bank account management device 10 determines the amount of wealth to be invested in each of the selected currencies determined in step 305. This calculation step may be similar or identical to step 105 in method 100, illustrated in FIG. 5(*b*) and previously described. Processor 18 may utilize diversification information 11 and bank account data file 12 for calculation of an optimized distribution of funds. In an alternative embodiment of the present invention, steps 305 and 306 may be performed concurrently. Once the new fund distribution ahs been determined, bank account management device 10 proceeds to step 307.

In step 307, bank account management device 10 modifies bank account data file 12 according to the optimized currency distribution determined in steps 305 and 306. In an exemplary embodiment of the present invention, output device 19 may modify bank account data file 12 according to instructions relayed by processor 18. In other embodiments of the present invention, output device 19 may output selected currency information 16, detailing modifications made to bank account data file 12, via output device 19.

In alternative embodiments of the present invention, bank account management device 10 may modify bank account data file 12 simultaneously or directly after step 304, the withdrawal of funds via output device 19. In such embodiments, bank account data file 12 may be modified to reflect the withdrawn funds, outputted as selected currency information 16. Further, following the modification of bank account data file 12, bank account management device 10 may then proceed to steps 305 and 306, in order to properly balance and distribute the funds in bank account data file 12 according to diversification information 11.

A system and method for bank account management and currency investment has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A device for a bank account management, comprising:
an input device adapted to receive information related to a diversification of a first fund of a user; and
a processor adapted to:
calculate a distribution of the first fund comprising one or more selected currencies, wherein the distribution of the first fund is based upon the diversification information;
convert the first fund from a first currency into a converted fund comprising one or more selected currencies based upon the calculated distribution; and
record information about the converted fund in a data file for the bank account;
wherein the calculation of the distribution of the first fund comprises:
calculating a percentage difference in an exchange rate between the first currency and each of the one or more selected currencies over a first time period;
calculating one or more ratio values by dividing a percentage difference in exchange rates for each of the one or more selected currencies by a largest percentage difference of an exchange rate over the first time period; and
calculating a normalized share for each of the one or more ratio values by:
adding each of the one or more ratio values together to equal a ratio value set; and
dividing each of the one or more ratio values by the ratio value set.

2. The device of claim 1, wherein a diversification information comprises a guideline factor for a calculation and distribution of the first funds.

3. The device of claim 2, wherein the guideline factor comprises a user risk factor.

4. The device of claim 2, wherein the guideline factor comprises a rate of yield factor.

5. The device of claim 2, wherein the guideline factor comprises a currency efficiency rate factor.

6. The device of claim 2, wherein the guideline factor comprises currency exchange rate data.

7. The device of claim 2, wherein the guideline factor comprises:
gross domestic product of a nation.

8. The device of claim 1, wherein information related to the diversification comprises receiving information related to the first fund.

9. The device of claim 1, wherein information related to the diversification comprises receiving information related to the selected currency.

10. The device of claim 9, wherein the selected currency comprises the first currency.

11. The device of claim 1, wherein the input device is further adapted to receive a request to open the bank account.

12. The device of claim 1, wherein the processor is further adapted to create a data file for the bank account.

13. The device of claim 8, wherein information related to the first fund in an initial currency comprises a fund deposit to the bank account.

14. The device of claim 8, wherein information related to the first fund in an initial currency comprises a fund withdrawal from the bank account.

15. A method for managing a bank account, comprising:
receiving information by an input device related to a diversification of a first fund of a user;
calculating a distribution by a processor of the first fund comprising one or more selected currencies, wherein the distribution of the first fund is based upon the diversification information;
converting the first fund by the processor from a first currency into a converted fund comprising the selected currencies based upon the calculated distribution; and
recording information by the processor about the converted fund in a data file for the bank accounts;
wherein the calculation of the distribution of the first fund comprises:
calculating a percentage difference in an exchange rate between the first currency and each of the one or more selected currencies over a first time period;
calculating one or more ratio values by dividing a percentage difference in exchange rates for each of the one or more selected currencies by a largest percentage difference of an exchange rate over the first time period; and
calculating a normalized share for each of the one or more ratio values by:
adding each of the one or more ratio values together to equal a ratio value set; and dividing each of the one or more ratio values by the ratio value set.

16. The method of claim 15, wherein a diversification information comprises a guideline factor for a calculation and distribution of the first funds.

17. The method of claim 16, wherein the guideline factor comprises a user risk factor.

18. The method of claim 16, wherein the guideline factor comprises a rate of yield factor.

19. The method of claim 16, wherein the guideline factor comprises a currency efficiency rate factor.

20. The method of claim 16, wherein the guideline factor comprises currency exchange rate data.

21. The method of claim 16, wherein the guideline factor comprises:
gross domestic product of a nation.

22. The method of claim 15, wherein information related to the diversification comprises receiving information related to the first fund.

23. The method of claim 15, wherein information related to the diversification comprises receiving information related to the selected currency.

24. The method of claim 16, wherein the selected currency comprises the first currency.

25. The method of claim 15, further comprising receiving a request to open the bank account.

26. The method of claim 15, further comprising creating a data file for the bank account.

27. The method of claim 22 wherein information related to the first fund comprises a fund deposit to the bank account.

28. The method of claim 22 wherein information related to the first fund comprises a fund withdrawal from the bank account.

29. A non-transitory computer-readable medium including codes extractable by a computer, adapted to:
receive information related to a diversification of a first fund of a user;
calculate a distribution of the first fund comprising one or more selected currencies based upon the diversification information;
convert the first fund from an first currency into a converted fund comprising the one or more selected currencies based upon the calculated distribution; and
record information about the converted fund in a data file for a bank account;
wherein to calculate the distribution of the first fund comprises:
calculating a percentage difference in an exchange rate between the first currency and each of the one or more selected currencies over a first time period;
calculating one or more ratio values by dividing a percentage difference in exchange rates for each of the one or more selected currencies by a largest percentage difference of an exchange rate over the first time period; and
calculating a normalized share for each of the one or more ratio values by:
adding each of the one or more ratio values together to equal a ratio value set; and
dividing each of the one or more ratio values by the ratio value set.

30. The device of claim 2, wherein the guideline factor comprises one or more quarterly financial reports.

31. The method of claim 16, wherein the guideline factor comprises one or more quarterly financial reports.

* * * * *